United States Patent
Xiao et al.

(10) Patent No.: US 12,288,986 B1
(45) Date of Patent: Apr. 29, 2025

(54) METHOD AND DEVICE FOR SUPPORTING WEAK NETWORKS IN AC/DC DISTRIBUTION NETWORK

(71) Applicant: Tianjin University, Tianjin (CN)

(72) Inventors: Qian Xiao, Tianjin (CN); Wenbiao Lu, Tianjin (CN); Hongjie Jia, Tianjin (CN); Yunfei Mu, Tianjin (CN); Yu Jin, Tianjin (CN); Tianxiang Li, Tianjin (CN); Yidi Zhu, Tianjin (CN); Yansong Zhao, Tianjin (CN); Huiqiao Liu, Tianjin (CN); Xiaodan Yu, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/922,457

(22) Filed: Oct. 22, 2024

(30) Foreign Application Priority Data

May 29, 2024 (CN) .......................... 202410677280.3

(51) Int. Cl.
*H02J 3/06* (2006.01)
*H02J 3/24* (2006.01)
*H02J 3/38* (2006.01)

(52) U.S. Cl.
CPC ............... *H02J 3/06* (2013.01); *H02J 3/241* (2020.01); *H02J 3/38* (2013.01); *H02J 2203/20* (2020.01)

(58) Field of Classification Search
CPC ...... H02J 3/06; H02J 3/241; H02J 3/38; H02J 2203/20
See application file for complete search history.

(56) References Cited

U.S. PATENT DOCUMENTS

2016/0369761 A1* 12/2016 Schnellinger ....... F02N 11/0866
2017/0250540 A1* 8/2017 Varma ...................... H02J 3/46
(Continued)

FOREIGN PATENT DOCUMENTS

| CN | 111740426 A | 10/2020 |
| CN | 115833183 A | 3/2023 |

(Continued)

OTHER PUBLICATIONS

Zhang Zhirong, Research on Economic Dispatching and Voltage Optimization of AC/DC Hybrid Distribution Network, Sichuan University, 2021, pp. 45-50.
(Continued)

*Primary Examiner* — Ziaul Karim
(74) *Attorney, Agent, or Firm* — Bayramoglu Law Offices LLC

(57) ABSTRACT

A method and device for supporting weak networks in an AC/DC distribution network are provided. The method includes the following steps: constructing a topology of the AC/DC distribution network, where the topology is configured to support the weak networks and isolate faults actively, and the topology is a multi-terminal ring structure; establishing a distributed optimization method for the AC/DC distribution network based on the topology; obtaining power fluctuations of the AC/DC distribution network, where the AC/DC distribution network can switch a droop control mode automatically according to the power fluctuations; and obtaining frequency fluctuations of the AC/DC distribution network, where the AC/DC distribution network performs energy dispatching according to the frequency fluctuations to match the droop control mode of the AC/DC distribution network.

10 Claims, 2 Drawing Sheets

(56) References Cited

U.S. PATENT DOCUMENTS

| | | | | |
|---|---|---|---|---|
| 2019/0145371 | A1* | 5/2019 | Schnellinger | H02J 1/10 |
| | | | | 290/31 |
| 2020/0106303 | A1* | 4/2020 | Thrimawithana | H04B 5/79 |
| 2021/0075221 | A1* | 3/2021 | Worku | H02J 9/062 |
| 2021/0098990 | A1* | 4/2021 | Peng | H02J 3/32 |
| 2021/0188106 | A1* | 6/2021 | Asa | H02M 5/293 |
| 2022/0166223 | A1* | 5/2022 | Varma | H02M 7/44 |

FOREIGN PATENT DOCUMENTS

| | | |
|---|---|---|
| CN | 115864415 A | 3/2023 |
| CN | 117937413 A | 4/2024 |
| WO | 2019165701 A1 | 9/2019 |

OTHER PUBLICATIONS

Nie Yongquan, et al, Parallel Distributed Optimal Economic Dispatch of High Penetration Microgrid Based on Edge Computing, Southern Power System Technology, 2023, pp. 114-124, vol. 17 No. 1.

* cited by examiner

```
┌─────────────────────────────────────────────────────────────┐
│ Construct a topology of an AC/DC power distribution network,│
│ where the topology is configured to support the weak networks│
│ and isolate faults actively, and the topology is a multi-terminal│
│                     ring structure.                          │
└─────────────────────────────────────────────────────────────┘
                              │
┌─────────────────────────────────────────────────────────────┐
│   Establish a distributed optimization method for the AC/DC │
│      power distribution network based on the topology.      │
└─────────────────────────────────────────────────────────────┘
                              │
┌─────────────────────────────────────────────────────────────┐
│ Based on executing the distributed optimization method, obtain power│
│  fluctuations of the AC/DC power distribution network, where the AC/│
│   DC power distribution network can switch a droop control mode     │
│        automatically according to the power fluctuations.           │
└─────────────────────────────────────────────────────────────┘
                              │
┌─────────────────────────────────────────────────────────────┐
│   Based on executing the distributed optimization method, obtain   │
│ frequency fluctuations of the AC/DC power distribution network, where│
│   the AC/DC power distribution network performs energy dispatching  │
│ according to the frequency fluctuations to match the droop control mode│
│              of the AC/DC power distribution network.              │
└─────────────────────────────────────────────────────────────┘
```

FIG. 1

METHOD AND DEVICE FOR SUPPORTING WEAK NETWORKS IN AC/DC DISTRIBUTION NETWORK

CROSS REFERENCE TO THE RELATED APPLICATIONS

This application is based upon and claims priority to Chinese Patent Application No. 202410677280.3, filed on May 29, 2024, the entire contents of which are incorporated herein by reference.

TECHNICAL FIELD

The present invention relates to the technical field of distribution networks, in particular to a method and device for supporting weak networks in an AC/DC distribution network.

BACKGROUND

The existing topology of an AC/DC distribution network is only used for implementing the interconnection between AC/DC distribution networks, giving less considerations to the power supporting, frequency supporting and safe and reliable operation of multiple sub-regions under fault conditions. The existing coordinated control strategy can only realize single control or single improved control, can rarely realize the application of multiple control modes in the same converter, and cannot realize adaptive control mode switching for different power changes, so that the response capability of the system to power fluctuations needs to be improved.

SUMMARY

The present invention aims to solve at least one of the technical problems existing in the related art. Therefore, The present invention provides a method and device for supporting weak networks in an alternating current/direct current (AC/DC) distribution network, which solves the technical problems of insufficient power support and single control mode of a power network in the prior art, and improves the power mutual aid capability and the rapid power fluctuation response capability of a system.

The present invention provides a method for supporting weak networks in an AC/DC distribution network, including the following steps:
constructing a topology of the AC/DC distribution network, where the topology is configured to support the weak networks and isolate faults actively, and the topology is a multi-terminal ring structure;
establishing a distributed optimization method for the AC/DC distribution network based on the topology;
based on executing the distributed optimization method, obtaining power fluctuations of the AC/DC distribution network, where the AC/DC distribution network can automatically switch a droop control mode according to the power fluctuations; and
based on executing the distributed optimization method, obtaining frequency fluctuations of the AC/DC distribution network, where the AC/DC distribution network performs energy dispatching according to the frequency fluctuations to match the droop control mode of the AC/DC distribution network.

The further improvement of the method for supporting the weak networks in the AC/DC distribution network of the present invention is: the topology includes an AC weak network, two AC distribution networks, several modular multilevel converters, sensitive DC loads, low-carbon park loads, residential loads, and a plurality of new energy power generation units.

The further improvement of the method for supporting the weak networks in the AC/DC distribution network of the present invention is that the method includes the following steps:
based on the establishing a distributed optimization method of the AC/DC distribution network, according to the connection condition of the modular multilevel converters in the topology, dividing the AC/DC distribution network into several sub-regions, where the several sub-regions perform information communication and iteration by using an alternating direction method of multipliers to complete regional decoupling, and setting constraints that satisfy a boundary; and
setting a corresponding optimized dispatching scheme for each sub-region, and obtaining an operation result of the corresponding sub-region according to the optimized dispatching scheme.

The further improvement of the method for supporting the weak networks in the AC/DC distribution network is that the method further includes the following steps:
based on the setting constraints that satisfy a boundary, converting a boundary operation condition according to an augmented Lagrange method, and setting optimization models min $LA^i$ corresponding to the sub-regions, $$\min LA^i = F^i + \sum \left\{ \gamma_e^i (P^i - x_e) + \eta_e^i (U^i - x_e) + \frac{\rho_e^i}{2} \left[ (P^i - x_e)^2 + (U^i - x_e)^2 \right] \right\}$$

$$\begin{cases} P_{co}^i = x_P \\ U_{co}^i = x_U \end{cases}$$

where $F^i$ represents objective functions of the sub-regions, $LA^i$ represents augmented Lagrange functions of the sub-regions, $\gamma$ represents a first augmented Lagrange multiplier, $\eta$ represents a second augmented Lagrange multiplier, $\rho$ represents a penalty factor, e represents the current number of iterations, i represents a ith sub-region, $x_P$ and $x_U$ represent global variables and can be expressed by $x_e$ uniformly, $x_e$ represents a global variable under the current number of iterations, $P_{co}^i$ represents a power of a coupling branch, $U_{co}^i$ represents a voltage magnitude of a coupling branch node, $P^i$ represents power of coupling branches of adjacent distribution sub-regions, $U^i$ represents node voltage magnitudes of the coupling branches of the adjacent power distribution sub-regions, $\gamma_e^i$ represents a first augmented Lagrange multiplier corresponding to a sub-region under the current number of iterations, $\eta_e^i$ represents a second augmented Lagrange multiplier corresponding to the sub-region under the current number of iterations, $\rho_e^i$ represents a penalty factor corresponding to the sub-region under the current number of iterations.

The further improvement of the method for supporting the weak networks in the AC/DC distribution network is that the method further includes the following steps:

based on the fact that the AC/DC distribution network can automatically switch the droop control mode according to the power fluctuations, adopting an active power and frequency droop control mode at a side part of the modular multilevel converter close to an AC weak network, adopting a power and voltage droop control mode at a side part of the modular multilevel converter close to a DC distribution network, where the power and voltage droop control mode automatically switches a linear control mode according to the power fluctuations; and the linear control mode includes a tangent function mode, an exponential function mode, a linear function mode containing a dead band, and a basic linear function mode;

obtaining environment information, and predicting power fluctuations of the AC/DC distribution network at a set time according to the environment information;

when the power fluctuations of the AC/DC distribution network are less than a first threshold value, adopting the basic linear function mode;

when the AC/DC distribution network is in a maintenance stage, and the power fluctuations of the AC/DC distribution network in the maintenance stage are less than or equal to a second threshold value and greater than or equal to the first threshold value, adopting the linear function mode containing the dead band to manage the bus voltage of the AC/DC distribution network within a set fluctuation range;

when the predicted power fluctuations are greater than the second threshold value within a set time interval, adopting the tangent function mode; and when the predicted power fluctuations are greater than the second threshold value and the predicted power fluctuation duration is greater than the set time interval, adopting the exponential function mode to respond to the predicted power fluctuations.

The further improvement of the method for supporting the weak networks in the AC/DC distribution network is:

the tangent function mode tan $S_{tan}(V)$ is $$\frac{P - P_{ref}}{P_{ref}} = D_{droop} \tan\left(\frac{V - V_{ref}}{V_{ref}}\right) = S_{tan}(V)$$

where P represents a real-time output power of the modular multilevel converter, $P_{ref}$ represents a power reference of the modular multilevel converter, $D_{droop}$ represents a droop coefficient of the modular multilevel converter, V represents a node voltage of the modular multilevel converter, and $V_{ref}$ represents a voltage reference of the modular multilevel converter; and the exponential function mode $S_{exp}(V)$ is, $$\frac{P - P_{ref}}{P_{ref}} = D_{droop} \frac{1}{2}\left(\left(\exp\left(\frac{V - V_{ref}}{V_{ref}}\right) - 1\right) - \left(\exp\left(-\frac{V - V_{ref}}{V_{ref}}\right) - 1\right)\right) = S_{exp}(V)$$

the exponential function mode is adopted, and function parameters of the exponential function mode are correspondingly selected to switch the droop control mode.

The further improvement of the method for supporting the weak networks in the AC/DC distribution network is:

the linear function mode containing the dead band $S_{Lp}(V)$ is, $$\frac{P - P_{ref}}{P_{ref}} = \begin{cases} D_{droop}\left(\frac{V - V_{ref}}{V_{ref}}\right), & \text{if } V_{min} \leq V \leq V_{max} \\ D_{droop}\left(\frac{V_{min} - V_{ref}}{V_{ref}}\right), & \text{if } V \leq V_{min} = S_{Lp}(V) \\ D_{droop}\left(\frac{V_{max} - V_{ref}}{V_{ref}}\right), & \text{if } V_{max} \leq V \end{cases}$$

where P represents a real-time output power of the modular multilevel converter, $P_{ref}$ represents a power reference of the modular multilevel converter, $D_{droop}$ represents a droop V represents a node voltage of the modular coefficient of the modular multilevel converter, multilevel converter collected in real time, $V_{max}$ represents a maximum node voltage allowed by the modular multilevel converter, $V_{min}$ represents a minimum node voltage allowed by the modular multilevel converter, and $V_{ref}$ represents a voltage reference of the modular multilevel converter.

The further improvement of the method for supporting weak network in an AC/DC distribution network is:

the basic linear function mode $S_L(V)$ is, $$\frac{P - P_{ref}}{P_{ref}} = D_{droop}\left(\frac{V - V_{ref}}{V_{ref}}\right) = S_L(V)$$

where P represents a real-time output power of the modular multilevel converter, $P_{ref}$ represents a power reference of the modular multilevel converter, $D_{droop}$ represents a droop coefficient of the modular multilevel converter, V represents a node voltage of the modular multilevel converter, and $V_{ref}$ represents a voltage reference of the modular multilevel converter.

The further improvement of the method for supporting the weak networks in the AC/DC distribution network is that the topology has a frequency observer, base on the obtaining frequency fluctuations of the AC/DC distribution network, where the AC/DC distribution network performs energy dispatching according to the frequency fluctuations, when the frequency observer observes that the frequency fluctuations corresponding to the sub-regions are less than a set frequency threshold value, a weak network supporting function of the topology is activated, and other sub-regions transfer powers to the sub-regions where the frequency fluctuation is less than the set frequency threshold value, so that the frequencies of these sub-regions are increased by a rated value $f_N$; and when the weak network supporting function is activated, the droop control mode of the AC/DC distribution network is, $$\frac{P - P_{ref}}{P_{ref}} = S(V) + u_f$$

$$u_f = K_P(f_N - f) + K_I \int (f_N - f)$$

where P represents a real-time output power of the modular multilevel converter, $P_{ref}$ represents a power reference of the modular multilevel converter, $u_f$ represents a supplementary item of weak network supporting, $K_P$ represents a proportional parameter of a proportional integral (PI) controller in a modular multilevel converter controller corresponding to an AC distribution partition, $K_I$ represents an integral parameter of the PI controller of the modular multilevel converter controller corresponding to the AC distribution partition, f represents a local frequency collected by the weak network in real time, $f_N$ represents a frequency rated value, and S(V) represents one of the tangent function mode, the exponential function mode and the linear function mode containing the dead band.

The present invention further provides a device for supporting a weak network in an AC/DC distribution network for executing the method for supporting the weak networks in the AC/DC distribution network, as described above, including:

- a model constructing module, configured to establish the AC/DC distribution network containing an AC weak network, an AC distribution network, modular multilevel converters, multi-type loads, and a variety of new energy power generation units;
- a distributed optimization solution module, configured to divide the AC/DC distribution network into several sub-regions according to an AC/DC partition, realize the decoupling between the regions, and formulate boundary operation constraints between the multiple sub-regions;
- an optimization operation module, configured to perform resource dispatching by adopting an optimization method of day-ahead dispatching and intra-day rolling for the sub-regions and optimize control parameters of the modular multilevel converters;
- an adaptive control mode selection module, configured to adaptively select a droop control mode according to an actual operation state of the AC/DC distribution network; and
- a flexible transfer module, configured to activate a weak network supporting function when identifying the frequency drop of an AC weak network, modify the droop control modes of the multiple modular multilevel converters, and thus adjust interaction powers of the several sub-regions.

The one or more of the above technical solutions in the embodiment of the present invention have at least one of the following technical effects:

1) Compared with the traditional topology of an AC/DC distribution network, the multi-terminal ring AC/DC distribution network topology proposed according to the present invention considers the existence of the AC weak network, and can use the multi-termination interconnected modular multilevel converters to support the power of the AC weak network by the stable AC distribution network. At the same time, the modular multilevel converters have the characteristic of isolating faults actively to ensure safe and reliable power supply of the whole system;

2) Compared with the traditional coordinated control strategy, under the method of adaptive switching of a droop control mode proposed according to the present invention, different control methods are uniformly configured in the same modular multilevel converter, and the droop control mode can be adaptively switched for different operation scenarios, the capacity of the system for responding to different power fluctuations is improved, and the rapid tracking of a dispatching instruction is ensured, so that the system can obtain higher power quality; and 3) Compared with the traditional optimized dispatching of the AC/DC distribution network, the distributed optimization method proposed according to the present invention can realize the distributed iterative optimization between the AC distribution partition and the DC distribution partition, only a small amount of privacy-free information is communicated between different partitions, the information shielding and privacy protection between the AC/DC partitions are realized, and the power supply reliability can be improved while the optimization operation is realized in conjunction with the weak network supporting function.

The additional aspects and advantages of the present invention will be given in part in the following description, which will partly become apparent from the following description, or are known through the practice of the present invention.

BRIEF DESCRIPTION OF THE DRAWINGS

In order to more clearly illustrate the technical solutions of the present invention or the prior art, the following will briefly introduce the drawings used in the description of the embodiments or the prior art. Obviously, the drawings in the following description are some embodiments of the present invention. For those of ordinary skill in the art, other drawings may also be derived from these drawings without creative effort.

FIG. 1 is a flowchart of a method for supporting weak networks in an AC/DC distribution network provided according to the present invention.

DETAILED DESCRIPTION OF THE EMBODIMENTS

Figure 2:
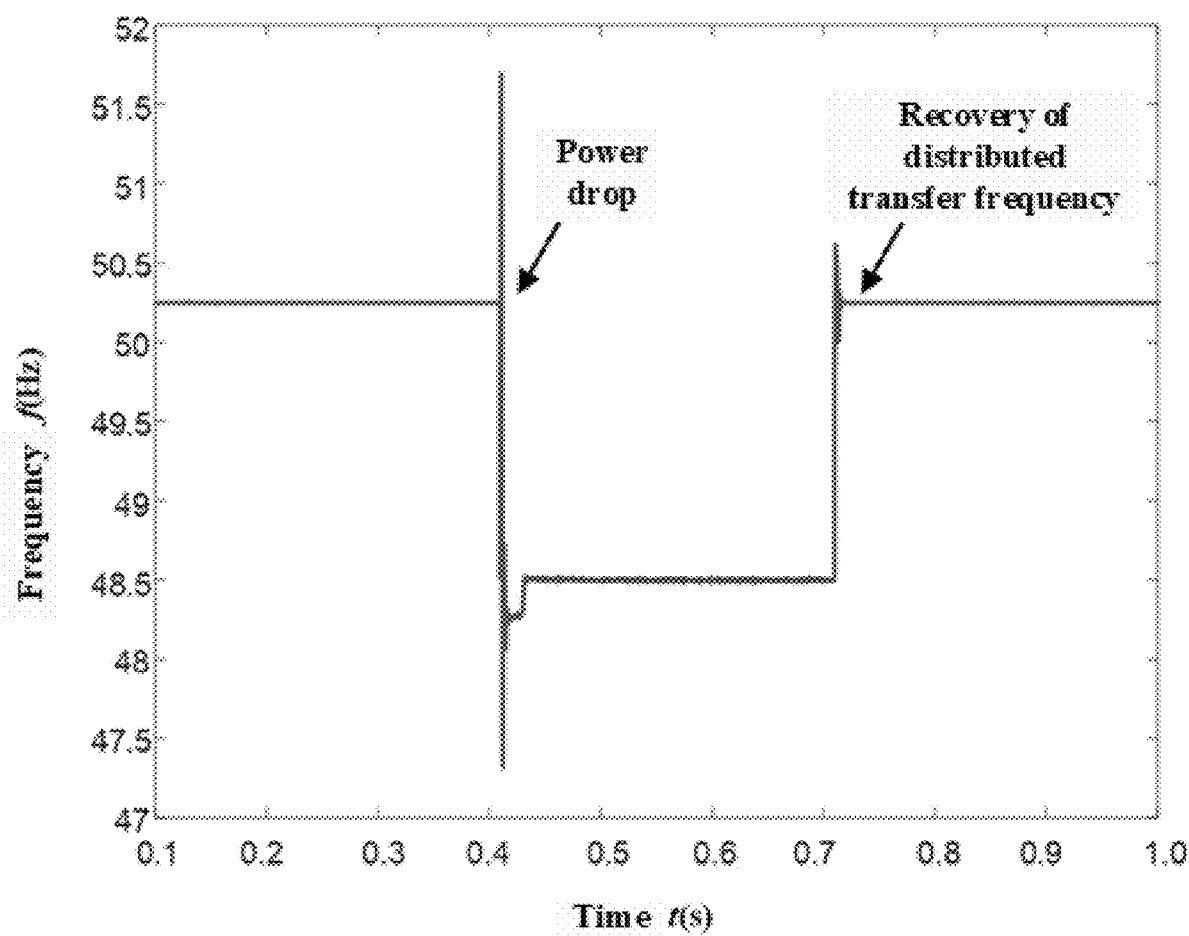
FIG. 2 is a frequency recovery diagram of a weak AC distribution network after weak network support according to the present invention.

In order to make the purpose, technical solution and advantages of the present invention clearer, the technical solution of the present invention will be clearly and completely described below in conjunction with the accompanying drawings of the present invention. Obviously, the described embodiments are part of the embodiments of the present invention, but not all of the embodiments. Based on the embodiments of the present invention, all other embodiments obtained by those of ordinary skill in the art without creative work are within the protection scope of the present invention. The following examples illustrate the present invention but are not intended to limit the scope of the present invention.

A method for supporting weak networks in an AC/DC distribution network of the present invention is described below in conjunction with FIG. 1, including the following steps:

constructing a topology of the AC/DC distribution network, where the topology is configured to support the weak networks and isolate faults actively, and the topology is a multi-terminal ring structure;

establishing a distributed optimization method for the AC/DC distribution network based on the topology, where when the range of the power fluctuations (the difference between the actually measured power value and the predicted power value) of the AC/DC distribution network is close to 0, the distributed optimization method can achieve the purpose of protecting the privacy of the power distribution information when the power distribution is performed by relying on the topology;

based on executing the distributed optimization method, obtaining power fluctuations of the AC/DC distribution network, where the AC/DC distribution network can automatically switch a droop control mode according to the power fluctuations; and based on executing the distributed optimization method, obtaining frequency fluctuations of the AC/DC distribution network, where the AC/DC distribution network performs energy dispatching according to the frequency fluctuations to match the droop control mode of the AC/DC distribution network.

In a preferable embodiment of the present invention, the topology includes an AC weak network, two AC distribution networks, two hybrid modular multilevel converters (MMC), a half-bridge modular multilevel converter (MMC), sensitive DC loads, low-carbon park loads, residential loads, and a plurality of new energy power generation units.

Specifically, the frequency and voltage of the AC weak network have no stable supporting, the frequency and voltage of the AC distribution network is stable, the AC weak network is a power network without the stable supporting of the frequency and voltage of the AC large power network, the inertia is insufficient, the frequency and voltage instability phenomena are easy to occur when the power fluctuations are large, the reliable power supply of the load in the AC distribution partition cannot be guaranteed. Through the topology of the ring AC/DC distribution network, a power transfer path of supporting power and frequency is provided for the AC weak network, the AC distribution network with stable frequency and voltage can provide stable AC power with constant voltage and constant frequency, and the AC power cannot only supply power for a local AC distribution network but also be converted into DC power to supply power to a DC load and other AC distribution networks through the modular multilevel converters. The hybrid modular multilevel converter adopts a hybrid topology consisting of a full-bridge sub-module and a half-bridge sub-module, has not only the characteristics of configuration economy of the half-bridge sub-module but also the characteristics of the DC fault ride-through capability of the full-bridge sub-module, is good in overall performance, has high power quality due to the number of the plurality of sub-modules, and can provide reliable power for a sensitive load. The AC weak network is connected with the two stable AC distribution networks, can actively isolate DC faults through a control mode when the DC faults occur, and ensures the safe operation of a stable AC system and the safe and reliable power supply in the network thereof. The half-bridge modular multilevel converter is cheap, and is connected to the AC weak network to mainly play the role of AC/DC conversion and energy transfer.

Specifically, sensitive DC loads have high power quality requirements. In actual projects, the sensitive DC loads can be large data centers, high-precision manufacturing factories, etc., and need to ensure that DC bus voltage fluctuations are within a certain safety range. The proportion of renewable energy in the low-carbon park load is relatively high. In the stage of high generation of new energy, the load demand may be less than power generation, and the power will be returned to the AC/DC distribution network. The residential load can participate in demand response to the weak network supporting, has the ability to participate in market regulation, and can be dispatched by the power market according to a demand response mechanism. In the actual projects, the loads can be an electric vehicle charging station of large communities and a large load aggregator with energy storage.

Further, based on the establishing a distributed optimization method for the AC/DC distribution networks, according to the connection condition of the modular multilevel converters in the topology, the AC/DC distribution network is divided into several sub-regions, where the several sub-regions perform information communication and iteration by using an alternating direction method of multipliers to complete regional decoupling, and constraints that satisfy a boundary are set; and a corresponding optimized dispatching scheme is set for each sub-region, and an operation result of the corresponding sub-region is obtained according to the optimized dispatching scheme.

Specifically, the AC distribution partition and the DC distribution partition adopt different optimized dispatching schemes to obtain optimal operation results and power quality. In different AC distribution partitions, according to the predicted data of distributed photovoltaic and wind turbine output power and load, the optimization methods of day-ahead dispatching and intra-day rolling are adopted to flexibly control flexible load, energy storage units and other units. In the DC distribution partition, the operation reference of the modular multilevel converter is formulated according to the predicted data of the distributed photovoltaic and wind turbine output power and load, and control parameters of the modular multilevel converter are optimized.

Through distributed iterative interaction between different regions, the boundary condition of each region is ensured to be satisfied and the regions are decoupled, the interaction information between different AC/DC regions is reduced, and the privacy information among different partitions is ensured not to be interacted, so that the key information protection function is played; and due to the characteristic of distributed operation, the method has strong embeddability, and is beneficial to the expansion of the topology and the reconstruction of a system.

Specifically, the method further includes the following steps:

based on the setting constraints that satisfy a boundary, converting a boundary operation condition according to an augmented Lagrange method, and setting optimization models min $LA^i$ corresponding to the sub-regions, $$\min LA^i = F^i + \sum \left\{ \gamma_e^i (P^i - x_e) + \eta_e^i (U^i - x_e) + \frac{\rho_e^i}{2} [(P^i - x_e)^2 + (U^i - x_e)^2] \right\}$$

$$\begin{cases} P_{co}^i = x_P \\ U_{co}^i = x_U \end{cases}$$

where $F^i$ represents objective functions of the sub-regions, $LA^i$ represents augmented Lagrange functions of the sub-regions, $\gamma$ represents a first augmented Lagrange multiplier, $\eta$ represents a second augmented Lagrange multiplier, $\rho$ represents a penalty factor, e represents the current number of iterations, i represents a ith sub-region, $x_P$ and $x_U$ represent global variables and can be expressed by $x_e$ uniformly, $x_e$ represents a global variable under the current number of iterations, $P_{co}{}^i$ represents a power of a coupling branch, $U_{co}{}^i$ represents a node voltage magnitude of the coupling branch, $P^i$ represents power of coupling branches of adjacent distribution sub-regions, $U^i$ represents node voltage magnitudes, of the coupling branches of the adjacent power distribution sub-regions, $\gamma_e{}^i$ represents a first augmented Lagrange multiplier corresponding to a sub-region under the current number of iterations, $\eta_e{}^i$ represents a second augmented Lagrange multiplier corresponding to the sub-region under the current number of iterations, $\rho_e{}^i$ represents a penalty factor corresponding to the sub-region under the current number of iterations.

In different AC distribution partitions, according to the long-term and short-term predicted data of distributed photovoltaic and wind turbine output power and load, the present invention adopts two-layer optimization to flexibly regulate the internal flexible load, energy storage units and other units. In the DC distribution partition, the present invention formulates operation references of the modular multilevel converter according to the predicted data of the distributed photovoltaic and wind turbine output power and load, and optimizes the control parameters of the modular multilevel converter in conjunction with the ultra-short-term predicted data.

The present invention adopts the form of hierarchical regulation to form a two-layer distributed regulation framework including a system dispatching layer and a coordinated control layer. In the upper-layer optimization architecture, with the minimum total operation cost of the system, based on the long-term predicted data of the output and load of distributed new energy, the dispatching instructions of each MMC and energy storage are determined. In the lower-level optimization architecture, based on the dispatching solution formulated by a dispatching layer of the AC distribution network. According to the short-term predicted data, the control coefficients of an MMC slave converter are optimized. Therefore, the DC system has the ability to quick respond to new energy (RESs) and load uncertainty and volatility, and further reduces the total operation cost of the system, and meanwhile, ensures that the bus voltage of the system does not exceed the limits.

In the hierarchical regulation method proposed according to the present invention, the optimization of the collaborative dispatching layer is triggered at regular intervals, and the time interval is defined as an "optimization interval" $T_{opt}$, a moment when a dispatching center sends a dispatching instruction to an MMC and an energy storage system is defined as a "dispatching instruction moment"; an interval between every two adjacent "dispatching instruction moments" is defined as a "dispatching interval" $\Delta t_L$, which is also an interval for the optimization of the coordinated control layer to be triggered; a moment within the "dispatching interval" is defined as an "intermediate moment", and an interval between every two adjacent "intermediate moments" is defined as an "intermediate interval".

Preferably, the present invention sets the "dispatching interval" to 10 min and the "intermediate interval" to 1 min.

Preferably, the present invention sets the optimization interval $T_{opt}$ to 1 h, a system dispatching layer optimization period is divided into an "accurate prediction period" and "other periods", the "accurate prediction period" is set to 1 h. Within the 1 h, the optimization step size of the variable to be optimized is the "dispatching interval", that is 10 min. During the "other periods", the optimization step size $\Delta t_h$ of the variable to be optimized is 1 h. After the optimization of the reference operation point, the optimization of the coordinated control layer is performed only in the "accurate prediction period"

(1) Upper-Layer Optimization Architecture: The Optimization of a Reference Operation Points of a System Dispatching Layer In the ring DC system constructed according to the present invention, all units (a MMC, an energy storage system, etc.) except for loads are managed and controlled by a dispatching center; the system dispatching layer will take the long-term predicted data of RESs and load and electricity price as the input and formulate the dispatching instructions of the operation references of the MMC by taking the total operation cost minimization of the system as the optimization objective.

Further, the present invention adopts the operating cost of the ring DC system to reflect the operating economy of the system, and the objective function is expressed as:

$$\min f_{MMC}^L = \sum_{k=1}^{N_{tL}} \left( \begin{array}{c} \sum_{i=1}^{N_{MMC}} p_{MMC,i}^k c_{net}^k + \sum_{i=1}^{N_{PV}} p_{PV,i}^k c_{PV}^k + \\ \sum_{i=1}^{N_{WT}} p_{WT,i}^k c_{WT}^k + \sum_{i=1}^{N_{ESS}} |p_{ESS,i}^k| c_{ESS}^k \end{array} \right) \Delta t_L +$$

$$\sum_{k=1}^{N_{th}} \left( \begin{array}{c} \sum_{i=1}^{N_{MMC}} p_{MMC,i}^m c_{net}^m + \sum_{i=1}^{N_{PV}} p_{PV,i}^m c_{PV}^m + \\ \sum_{i=1}^{N_{WT}} p_{WT,i}^m c_{WT}^m + \sum_{i=1}^{N_{ESS}} |p_{ESS,i}^m| c_{ESS}^m \end{array} \right) \Delta t_h$$

where $f_{MMC}^L$ represents a total operating cost of the system, $N_{MMC}$ represents the FL total number of the MMCs, $N_{PV}$ represents the total number of distributed photovoltaic power generation units, $N_{WT}$ represents the total number of wind turbine power generation units, $N_{ESS}$ represents the total number of the energy storage systems, $N_{tL}$ represents the total number of dispatching intervals $\Delta t_L$ included in the "accurate prediction period" in the optimization of the operation references, $N_{th}$ represents the total number of optimization step sizes $\Delta t_h$ included in "other periods", k represents a kth dispatching instruction, m represents a mth dispatching instruction in "other periods", $p_{MMC,i}$ represents a power purchased by the MMC from the AC power network, $p_{PV,i}$ represents a power generated by the distributed photovoltaic power generation unit, $p_{WT,i}$ represents a power generated by the wind turbine power generation unit, $p_{ESS,i}$ represents charging and discharging powers of the energy storage system, $c_{net}$ represents a real-time electricity price that the MMC purchases power from the AC power network, $c_{PV}$ represents a unit generation cost of the distributed photovoltaic power generation unit, $c_{WT}$ represents a unit power generation cost of the wind turbine power generation unit, $c_{ESS}$ represents a unit cost of charging and discharging energy loss of the energy storage system.

The power balance constraints to be met by the system are shown in the following formula. At any moment, the total power purchased by $N_{MMC}$ MMCs from the AC power network is an algebraic sum of the total power demanded by the load, the total charging and discharging power of the energy storage system, the total line loss power, and the total power outputted by RESs at the moment;

$$\sum_{i=1}^{N_{MMC}} p_{MMC,i}^t = \sum_{i=1}^{N_{load}} p_{load,i}^t + \sum_{i=1}^{N_{ESS}} p_{ESS,i}^t + \sum_{i=1}^{N_{branch}} p_{branchloss,i}^t - \sum_{i=1}^{N_{PV}} p_{PV,i}^t - \sum_{i=1}^{N_{WT}} p_{WT,i}^t$$

where $p_{load,i}^t$ represents a load demand power at a moment t, $p_{branchloss,i}^t$ represents a line loss power at a moment t, $N_{load}$ represents the total number of loads, and $N_{branch}$ represents the total number of branches; and in order to ensure the operation safety of the energy storage system, the upper and lower constraints of state of charge (SOC) need to be set. Taking the kth to k+1 dispatching instruction moment as an example, the constraints can be expressed as:

$$\Delta E_{ESS}^k = \left(P_{ch}^k \eta_{ch} - \frac{P_{disch}^k}{\eta_{disch}}\right)\Delta t_L$$

$$p_{ch,i}^k = p_{ESS,i}^t p_{disch,i}^k = 0, \text{ if } p_{ESS,i}^t > 0$$

$$p_{disch,i}^k = p_{ESS,i}^t p_{disch,i}^k = 0, \text{ if } p_{ESS,i}^t > 0$$

$$SOC^k C_{ESS} + \Delta E_{ESS}^k = SOC^{k+1} C_{ESS}$$

$$SOC_{min} \le SOC^k \le SOC_{max}$$

where $p_{ch,i}^k$ and $p_{disch,i}^k$ represent a charging power and a discharging power of the energy storage system at the kth dispatching instruction moment, respectively, $\Delta E_{ESS}^k$ represents a charging and discharging amount of the kth dispatching interval, $\eta_{ch}$ represents a charging efficiency, $\eta_{disch}$ represents a discharging efficiency, $C_{ESS}$ represents a capacity of the energy storage system, $SOC^k$ represents an SOC of the energy storage system at the kth dispatching instruction moment, $SOC_{max}$ and $SOC_{min}$ represent SOC upper and lower limits of the energy storage system, respectively.

(2) Lower-Layer Optimization Architecture: Droop Control Optimization of a Coordinated Control Layer Between Converters In the lower-layer optimization architecture, the dispatching center optimizes the droop control coefficients of each MMC slave converter according to the short-term predicted data of RESs and load, so that the MMC slave converter can deal with the volatility and uncertainty of RESs and load, further improve the system operation economy and ensure the safe and stable operation of the system. The objective of the coordinated control layer coefficient optimization is to minimize the power purchase cost, and taking a certain dispatching interval as an example, the target function is as follows:

$$f_{MMC}^S = \sum_{i=1}^{N_{MMC}} \sum_{n=1}^{N_{tS}} p_{MMC,i}^n c^n \Delta t_S$$

where $f_{MMC}^S$ is a total cost of purchasing power from the AC power network for $N_{MMC}$ MMCs in a short time scale, $N_{tS}$ is the number of intermediate intervals included in the dispatching interval, and $\Delta t_S$ is the intermediate intervals;

at each intermediate moment, the MMC slave converter needs to meet the droop control constraints as follows:

$$-\frac{p_{MMC,i}^k - p_{MMC,i}^n}{p_{MMC,i}^k} = D_{droopi}^k \left(\frac{v_{MMC,i}^k - v_{MMC,i}^n}{v_{MMC,i}^k}\right)$$

where $v_{MMC,i}^n$ represents an actual voltage of the MMC slave converter at the nth intermediate moment, $p_{MMC,i}^n$ represents an actual power of the MMC slave converter at the nth intermediate moment, $v_{MMC,i}^k$ represents a voltage reference of the MMC slave converter, $p_{MMC,i}^k$ represents a power reference of the MMC slave converter, $v_{MMC,i}^n$ represents a normal operation voltage of the system 20 kV (that is ±10 kV), and $D_{droopi}^k$ represents a droop coefficient to be optimized.

Specifically, the energy storage system (ESS) needs to meet the SOC upper and lower limit constraints similar to those found in the upper-layer optimization, which will not be repeated here.

Further, the method further includes the following steps:
based on the fact that the AC/DC distribution network can automatically switch the droop control mode according to the power fluctuations,
adopting an active power and frequency droop control mode at a side part of the modular multilevel converter close to an AC weak network, adopting a power and voltage droop control mode at a side part of the modular multilevel converter close to a DC distribution network, where the power and voltage droop control mode automatically switches a linear control mode according to the power fluctuations; and
the linear control mode includes a tangent function mode, an exponential function mode, a linear function mode containing a dead band, and a basic linear function mode;
obtaining environment information, and predicting power fluctuations of the AC/DC distribution network at a set time according to the environment information;
when the power fluctuations of the AC/DC distribution network are less than the first threshold value, adopting the basic linear function mode;
when the AC/DC distribution network is in a maintenance stage, and the power fluctuations of the AC/DC distribution network in the maintenance stage are less than or equal to the second threshold value and greater than or equal to the first threshold value, adopting the linear function mode containing the dead band to manage the bus voltage of the AC/DC distribution network within a set fluctuation range;
when the predicted power fluctuations are greater than the second threshold value within a set time interval, adopting the tangent function mode; and
when the predicted power fluctuations are greater than the second threshold value and the predicted power fluctuation duration is greater than the set time interval, adopting the exponential function mode to respond to the predicted power fluctuations.

Preferably, the set time interval is an instantaneous time, which can be 0.1 s, 0.5 s, 1 s, etc., and those skilled in the art can perform corresponding settings according to the actual requirements.

The droop function expressions corresponding to each function are $S_{tan}(V)$, $S_{exp}(V)$, $S_{Lp}(V)$ and $S_L(V)$. A general expression $S(V)$ is adopted for expression, as follows:

$$\frac{P - P_{ref}}{P_{ref}} = S(V)$$

Specifically, the tangent function mode $S_{tan}(V)$ is:

$$\frac{P - P_{ref}}{P_{ref}} = D_{droop} \tan\left(\frac{V - V_{ref}}{V_{ref}}\right) = S_{tan}(V)$$

where P represents a real-time output power of the modular multilevel converter, $P_{ref}$ represents a power reference of the modular multilevel converter, $D_{droop}$ represents a droop coefficient of the modular multilevel converter, V represents a node voltage of the modular multilevel converter collected in real time, and $V_{ref}$ represents a voltage reference of the modular multilevel converter; and the exponential function mode $S_{exp}(V)$ is, $$\frac{P - P_{ref}}{P_{ref}} = D_{droop} \frac{1}{2}\left(\left(\exp\left(\frac{V - V_{ref}}{V_{ref}}\right) - 1\right) - \left(\exp\left(-\frac{V - V_{ref}}{V_{ref}}\right) - 1\right)\right) = S_{exp}(V)$$

where P represents a real-time output power of the modular multilevel converter, $P_{ref}$ represents a power reference of the modular multilevel converter, $D_{droop}$ represents a droop coefficient of the modular multilevel converter, V represents a node voltage of the modular multilevel converter collected in real time, and $V_{ref}$ represents a voltage reference of the modular multilevel converter.

Preferably, the second threshold is 10%. When an operator of the system knows that power generation short-term predicted data of the photovoltaic and wind turbine will have a large error, or it is foreseeable that the power fluctuations of the system are caused under a specific amplitude, the exponential function is adopted, and the function parameters of the exponential function are flexibly selected, in the case of specific fluctuations, the DC bus voltage is managed, and the control mode switching process is ensured to be relatively smooth. When the operator of the system knows that it is foreseeable that the extremely rapid power fluctuation of the system is caused under a specific amplitude, namely when the predicated power fluctuation is greater than the second threshold value, the tangent function is adopted, the function parameters of the tangent function are flexibly selected, the rapid power fluctuation is flexibly responded, the DC bus voltage is managed quickly in real time, and the control mode switching process is ensured to be relatively smooth. However, the control mode cannot be adopted for a long time, which is not conducive to the long-term steady and stable operation of the system.

Specifically, the linear function containing a dead band $S_{Lp}(V)$ is, $$\frac{P - P_{ref}}{P_{ref}} = \begin{cases} D_{droop}\left(\frac{V - V_{ref}}{V_{ref}}\right), & \text{if } V_{min} \leq V \leq V_{max} \\ D_{droop}\left(\frac{V_{min} - V_{ref}}{V_{ref}}\right), & \text{if } V \leq V_{min} = S_{Lp}(V) \\ D_{droop}\left(\frac{V_{max} - V_{ref}}{V_{ref}}\right), & \text{if } V_{max} \leq V \end{cases}$$

where P represents a real-time output power of the modular multilevel converter, $P_{ref}$ represents a power reference of the modular multilevel converter, $D_{droop}$ represents a droop coefficient of the modular multilevel converter, V represents a node voltage of the modular multilevel converter collected in real time, $V_{max}$ represents a maximum node voltage allowed by the modular multilevel converter, $V_{min}$ represents a minimum node voltage allowed by the modular multilevel converter, and $V_{ref}$ represents a voltage reference of the modular multilevel converter.

Specifically, the first threshold is 1%. When the system is in the stage requiring maintenance, and it is foreseeable that large power fluctuations will occur, but the amplitude of the fluctuations is uncertain, the linear function containing a dead band is adopted to manage the DC bus voltage within the allowable fluctuation range, but the smoothness of the control is poor.

Specifically, the basic linear function mode $S_L(V)$ is, $$\frac{P - P_{ref}}{P_{ref}} = D_{droop}\left(\frac{V - V_{ref}}{V_{ref}}\right) = S_L(V)$$

where P represents a real-time output power of the modular multilevel converter, $P_{ref}$ represents a power reference of the modular multilevel converter, $D_{droop}$ represents a droop coefficient of the modular multilevel converter, V represents a node voltage of the modular multilevel converter collected in real time, and $V_{ref}$ represents a voltage reference of the modular multilevel converter; and when the power fluctuations of the AC/DC distribution network are less than the first threshold value, the basic linear function method is adopted. When the power fluctuations of the system are small, that is, less than 1%, and the power generation short-term predicted data of the photovoltaic and wind turbine is more accurate, the relatively practical and basic linear function is adopted to respond to the power fluctuation in real time.

Preferably, all modular multilevel converters in the AC/DC distribution network adopt the idea of droop control, and the supply power and the voltage are not fixed; and the AC side of the modular multilevel converter connected with the AC weak network adopts an active power and frequency droop control mode, so as to provide stable AC power for the system, and ensure that the frequency and the voltage do not exceed the limit. The DC side of the modular multilevel converter connected with other AC distribution networks adopts the idea of power and voltage droop control, but the droop control function relationship does not only adopt the basic linear control mode, but also can adaptively and dynamically switch the droop control mode according to the actual system operation condition.

Further, the topology has a frequency observer, base on the obtaining frequency fluctuations of the AC/DC distribution network, where the AC/DC distribution network performs energy dispatching according to the frequency fluctuations, when the frequency observer observes that the frequency fluctuations corresponding to the sub-regions are less than a set frequency threshold value, a weak network supporting function of the topology is activated, and other sub-regions transfer powers to the sub-regions where the frequency fluctuation is less than the set frequency threshold value, so that the frequencies of these sub-regions are increased by a rated value $f_N$; and when the weak network supporting function is activated, the droop control mode of the AC/DC distribution network is, $$\frac{P - P_{ref}}{P_{ref}} = S(V) + u_f$$

$$u_f = K_P(f_N - f) + K_I \int (f_N - f)$$

where P represents a real-time output power of the modular multilevel converter, $P_{ref}$ represents a power reference of the modular multilevel converter, $u_f$ represents a supplementary item of weak network supporting, $K_P$ represents a proportional parameter of a PI controller in a modular multilevel converter controller corresponding to an AC distribution partition, $K_I$ represents an integral parameter of the PI controller of the modular multilevel converter controller corresponding to the AC distribution partition, f represents a local frequency collected by the weak network in real time, and $f_N$ represents a frequency rated value, which is 50 Hz.

It should be noted that at this time, the frequency of the weak network will no longer be kept secret, the reliable power supply demand for the load of distribution partition will be greater than the frequency security demand, and the control mode of the half-bridge modular multilevel converter connected to the weak network will not be modified.

Further, based on the energy optimization management method and the control strategy, power and frequency supporting and voltage maintenance are performed on the multi-terminal ring AC/DC hybrid distribution network constructed according to the present invention, and the effectiveness of the optimization management method and the coordinated control strategy is verified.

In order to verify the effectiveness of the proposed method, the present invention performs analysis, calculation and simulation operation on the basis of a medium-voltage DC distribution network. The capacity of an ESS power station is set as 28 MWh, the initial SOC value is set as 20%, the SOCmin is set as 10%, the SOCmax is set as 90%, the charging efficiency $\eta_{ch}$ and the discharging efficiency $\eta_{disch}$ are set as 90%, the unit power generation costs of a distributed photovoltaic power generation unit and a wind turbine power generation unit are 29.6 $/MWh and 39.22 $/MWh, respectively, the unit cost of charging and discharging energy loss of the energy storage system is 50 $/MWh, and the allowable fluctuation range of DC bus voltages in the system is set to ±3% UN.

The present invention provides three scenarios, as shown in Table 1:

TABLE 1

| Scenario | ESS power station | Control mode of MMC slave converter |
|---|---|---|
| Scenario 1 | Participate in optimization operation | Droop control (The droop coefficient is unoptimized) |
| Scenario 2 | Participate in optimization operation | Droop control (The droop coefficient is optimized) |
| Scenario 3 | Participate in optimization operation | Droop control (Adaptive mode switching) |

The details of each scenario are as follows:

Scenario 1: The energy storage system participates in the optimization operation. The operation reference of the MMC slave converter is determined by the optimal dispatching solution of the system dispatching layer, and the droop control with unoptimized droop coefficient is adopted;

Scenario 2: The energy storage system participates in the optimization operation. The operation reference of the MMC slave converter is also determined by the optimal dispatching solution of the system dispatching layer, and the droop coefficient is determined by the coefficient optimization of the coordinated control layer based on the predicted data;

Scenario 3: The energy storage system participates in the optimization operation. The operation reference of the MMC slave converter is also determined by the optimal dispatching solution of the system dispatching layer, and the droop coefficient is optimized by the coefficient of the coordinated control layer based on the predicted data, and the droop control mode is adopted for adaptive switching;

(1) Operation Analysis of Medium-Voltage DC Distribution Network Under Special Conditions When the short-time scale predicted data of RESs and load have a large deviation, or the system fluctuates greatly due to other uncontrollable events in actual production, the DC bus voltage of the medium-voltage DC distribution network will deviate greatly, thus affecting the safe and stable operation of the system. In order to further analyze the effectiveness of the droop control mode adaptive switching in dealing with special conditions, it is assumed that during the 10:10 to 10:20 period, at 10:10:03, the data center load of a node 18 surges by 100% from 4.8 MW to 9.6 MW.

In a simulation environment, under the specific conditions, the voltages $V_{18}$ of the nodes 18 under the droop coefficient optimization and the droop control mode adaptive switching are compared, $V_{18}$ under the conventional droop control is adopted, when the MMC slave converter adopts the droop control of the optimized droop coefficient of scenario 1, $V_{18}$ will drop by a large margin, exceeding the lower limit of the allowable voltage fluctuation range, i.e., 20×(1−3%) kV=19.40 kV. When the MMC slave converter of the system adopts the droop control with optimized droop coefficient, $V_{18}$ will be within the allowable fluctuation range. When the droop control mode adaptive switching method is adopted, the MMC slave converter can respond to the load surge more quickly and reduce the voltage drop amplitude.

Therefore, compared with the traditional droop control, the proposed droop control mode adaptive switching method can better deal with the large fluctuations of RESs and load, and improve the operation safety of the medium-voltage DC distribution system under special conditions.

Further, when the system observes that the frequency of a certain AC distribution partition drops and is lower than a lower frequency limit due to the sudden power increase, the system will activate the weak network supporting function, and the AC distribution partition with strong network supporting connected with the weak network will perform distributed power transfer through the hybrid modular multilevel converter and the DC distribution partition. The frequency of the system recovers to the rated value within about 0.3 s after the frequency exceeds the limit, as shown in FIG. 2.

Therefore, the weak network supporting capability can help system quickly respond to the risk that the frequency exceeds the limit due to power fluctuations, ensure the safe and stable operation of the medium-voltage DC distribution system under emergency conditions, and further improve the power quality.

The present invention also provides a device for supporting weak networks in an AC/DC distribution network for performing the method for supporting the weak networks in the AC/DC distribution network, as described above, including:
- a model constructing module, configured to establish the AC/DC distribution network containing an AC weak network, an AC distribution network, several modular multilevel converters, multi-type loads and a variety of new energy power generation units;
- a distributed optimization solution module, configured to divide the AC/DC distribution network into several sub-regions according to an AC/DC partition, realize the decoupling between regions, and formulate boundary operation constraints between the multiple sub-regions;
- an optimization operation module, configured to perform resource dispatching by adopting an optimization method of day-ahead dispatching and intra-day rolling for the sub-regions and optimize control parameters of the modular multilevel converters;
- an adaptive control mode selection module, configured to adaptively select a droop control mode according to an actual operation state of the AC/DC distribution network; and
- a flexible transfer module, configured to activate a weak network supporting function when identifying the frequency drop of an AC weak network, modify the droop control modes of the multiple modular multilevel converters, and thus adjust interaction powers of the several sub-regions.

The one or more of the above technical solutions in the embodiment of the present invention have at least one of the following technical effects:
1) Compared with the traditional topology of an AC/DC distribution network, the multi-terminal ring AC/DC distribution network topology proposed according to the present invention considers the existence of the AC weak network, and can use the multi-termination interconnected modular multilevel converters to support the power of the AC weak network by the stable AC distribution network. At the same time, the modular multilevel converters have the characteristic of isolating faults actively to ensure safe and reliable power supply of the whole system;
2) Compared with the traditional coordinated control strategy, under the method of adaptive switching of a droop control mode proposed according to the present invention, different control methods are uniformly configured in the same modular multilevel converter, and the droop control mode can be adaptively switched for different operation scenarios, the capacity of the system for responding to different power fluctuations is improved, and the rapid tracking of a dispatching instruction is ensured, so that the system can obtain higher power quality; and
3) Compared with the traditional optimized dispatching of the AC/DC distribution network, the distributed optimization method proposed according to the present invention can realize the distributed iterative optimization between the AC distribution partition and the DC distribution partition, only a small amount of privacy-free information is communicated between different partitions, the information shielding and privacy protection between the AC/DC partitions are realized, and the power supply reliability can be improved while the optimization operation is realized in conjunction with the weak network supporting function.

Finally, it should be noted that the above embodiments are only used to illustrate the technical solutions of the present invention, not to limit the same. Although the present invention has been described in detail with reference to the foregoing embodiments, those of ordinary skill in the art should understand that the technical solutions described in the foregoing embodiments can still be modified, or some of the technical features thereof can be equivalently replaced. These modifications or substitutions do not make the essence of the corresponding technical solutions deviate from the spirit and scope of the technical solutions of the embodiments of the present invention.

What is claimed is:

1. A method for supporting power networks in an alternating current/direct current (AC/DC) distribution network, comprising the following steps:
constructing a topology of the AC/DC distribution network, wherein the topology is configured to support the power networks and isolate faults actively, the topology is a multi-terminal ring structure, and the topology comprises an AC power network, two AC distribution networks, a plurality of modular multilevel converters, sensitive DC loads, low-carbon park loads, residential loads, and a plurality of new energy power generation units;
establishing a distributed optimization method for the AC/DC distribution network based on the topology;
according to a connection condition of the plurality of modular multilevel converters in the topology, dividing the AC/DC distribution network into a plurality of sub-regions, wherein the plurality of sub-regions perform an information communication and an iteration by using an alternating direction method of multipliers to complete a regional decoupling, and setting constraints, wherein the constraints satisfy a boundary;
based on the constraints set to satisfy the boundary, converting a boundary operation condition according to an augmented Lagrange method, and setting optimization models min $LA^i$ corresponding to the plurality of sub-regions, $$\min LA^i = F^i + \sum \left\{ \gamma_e^i(P^i - x_e) + \eta_e^i(U^i - x_e) + \frac{\rho_e^i}{2}\left[(P^i - x_e)^2 + (U^i - x_e)^2\right] \right\}$$

-continued
$$\begin{cases} P_{co}^i = x_P \\ U_{co}^i = x_U \end{cases}$$

wherein $F^i$ represents objective functions of the plurality of sub-regions, $LA^i$ represents augmented Lagrange functions of the plurality of sub-regions, γ represents a first augmented Lagrange multiplier, η represents a second augmented Lagrange multiplier, ρ represents a penalty factor, e represents a current number of the iterations, i represents a ith sub-region, $x_P$ and $x_U$ represent global variables and are expressed by $x_e$ uniformly, $x_e$ represents a global variable under the current number of the iterations, $P_{co}^i$ represents a power of a coupling branch, $U_{co}^i$ represents a node voltage magnitude of the coupling branch, $P_i$ represents a power of coupling branches of adjacent power distribution sub-regions, $U^i$ represents node voltage magnitudes of the coupling branches of the adjacent power distribution sub-regions, $\gamma_e^i$ represents a first augmented Lagrange multiplier of a corresponding sub-region under the current number, of the iterations, $\eta_e^i$ represents a second augmented Lagrange multiplier of the corresponding sub-region under the current number of the iterations, and $\rho_e^i$ represents a penalty factor of the corresponding sub-region under the current number of the iterations;

setting a corresponding optimized dispatching scheme for each of the plurality of sub-regions, and obtaining an operation result of corresponding sub-regions according to the corresponding optimized dispatching scheme;

based on executing the distributed optimization method, obtaining power fluctuations of the AC/DC distribution network, wherein the AC/DC distribution network automatically switches a droop control mode according to the power fluctuations;

based on executing the distributed optimization method, obtaining frequency fluctuations of the AC/DC distribution network, wherein the AC/DC distribution network performs an energy dispatching according to the frequency fluctuations to match the droop control mode of the AC/DC distribution network;

based on a fact that the AC/DC distribution network automatically switches the droop control mode according to the power fluctuations, adopting an active power and frequency droop control mode at a side part of the modular multilevel converter close to the AC power network, adopting a power and voltage droop control mode at a side part of the modular multilevel converter close to a DC distribution network, wherein the power and voltage droop control mode automatically switches a linear control mode according to the power fluctuations; and the linear control mode comprises a tangent function mode $S_{tan}(V)$, an exponential function mode $S_{exp}(V)$ a linear function mode containing a dead band $S_{Lp}(V)$, and a basic linear function mode $S_L(V)$;

obtaining environment information, and predicting power fluctuations of the AC/DC distribution network at a set time according to the environment information to obtain predicted power fluctuations;

when the power fluctuations of the AC/DC distribution network are less than a first threshold value, adopting the basic linear function mode $S_L(V)$;

when the AC/DC distribution network is in a maintenance stage, and the power fluctuations of the AC/DC distribution network in the maintenance stage are less than or equal to a second threshold value and greater than or equal to the first threshold value, adopting the linear function mode containing the dead band $S_{Lp}(V)$ to manage a bus voltage of the AC/DC distribution network within a set fluctuation range;

when the predicted power fluctuations are greater than the second threshold value within a set time interval, adopting the tangent function mode $S_{tan}(V)$; and when the predicted power fluctuations are greater than the second threshold value and a predicted power fluctuation duration is greater than the set time interval, adopting the exponential function mode $S_{exp}(V)$ to respond to the predicted power fluctuations.

2. The method for supporting the power networks in the AC/DC distribution network according to claim 1, wherein the tangent function mode $S_{tan}(V)$ is $$\frac{P - P_{ref}}{P_{ref}} = D_{droop} \tan\left(\frac{V - V_{ref}}{V_{ref}}\right) = S_{tan}(V),$$

wherein P represents a real-time output power of the modular multilevel converter, $P_{ref}$ represents a power reference of the modular multilevel converter, $D_{droop}$ represents a droop coefficient of the modular multilevel converter, V represents a node voltage of the modular multilevel converter collected in real time, and $V_{ref}$ represents a voltage reference of the modular multilevel converter; and the exponential function mode $S_{exp}(V)$ is $$\frac{P - P_{ref}}{P_{ref}} =$$
$$D_{droop}\frac{1}{2}\left(\left(\exp\left(\frac{V - V_{ref}}{V_{ref}}\right) - 1\right) - \left(\exp\left(-\frac{V - V_{ref}}{V_{ref}}\right) - 1\right)\right) = S_{exp}(V),$$

wherein the exponential function mode $S_{exp}(V)$ is adopted, and function parameters of the exponential function mode $S_{exp}(V)$ are correspondingly selected to switch the droop control mode.

3. The method for supporting the power networks in the AC/DC distribution network according to claim 1, wherein the linear function mode containing the dead band $S_{Lp}(V)$ is $$\frac{P - P_{ref}}{P_{ref}} = \begin{cases} D_{droop}\left(\frac{V - V_{ref}}{V_{ref}}\right), & \text{if } V_{min} \leq V \leq V_{max} \\ D_{droop}\left(\frac{V_{min} - V_{ref}}{V_{ref}}\right), & \text{if } V \leq V_{min} = S_{Lp}(V), \\ D_{droop}\left(\frac{V_{max} - V_{ref}}{V_{ref}}\right), & \text{if } V_{max} \leq V \end{cases}$$

wherein P represents a real-time output power of the modular multilevel converter, $P_{ref}$ represents a power reference of the modular multilevel converter, $D_{droop}$ represents a droop coefficient of the modular multilevel converter, V represents a node voltage of the modular multilevel converter collected in real time, $V_{max}$ represents a maximum node voltage allowed by the modular multilevel converter, $V_{min}$ represents a minimum node voltage allowed by the modular multilevel converter, and $V_{ref}$ represents a voltage reference of the modular multilevel converter.

4. The method for supporting the power networks in the AC/DC distribution network according to claim 1, wherein the basic linear function mode $S_L(V)$ is $$\frac{P - P_{ref}}{P_{ref}} = D_{droop}\left(\frac{V - V_{ref}}{V_{ref}}\right) = S_L(V),$$

wherein P represents a real-time output power of the modular multilevel converter, $P_{ref}$ represents a power reference of the modular multilevel converter, $D_{droop}$ represents a droop coefficient of the modular multilevel converter, V represents a node voltage of the modular multilevel converter collected in real time, and $V_{ref}$ represents a voltage reference of the modular multilevel converter.

5. The method for supporting the power networks in the AC/DC distribution network according to claim 1, wherein the topology has a frequency observer, base on the frequency fluctuations of the AC/DC distribution network, wherein the AC/DC distribution network performs the energy dispatching according to the frequency fluctuations, when the frequency observer observes that frequency fluctuations corresponding to the sub-regions are less than a set frequency threshold value, a power network supporting function of the topology is activated, and other sub-regions transfer powers to the sub-regions where the frequency fluctuation is less than the set frequency threshold value, to increase frequencies of the sub-regions where the frequency fluctuation is less than the set frequency threshold value by a rated value $f_N$; and when the power network supporting function is activated, the droop control mode of the AC/DC distribution network is $$\frac{P - P_{ref}}{P_{ref}} = S(V) + u_f$$

$$u_f = K_P(f_N - f) + K_I\int(f_N - f),$$

wherein P represents a real-time output power of the modular multilevel converter, $P_{ref}$ represents a power reference of the modular multilevel converter, $u_f$ represents a supplementary item of power network supporting function, $K_P$ represents a proportional parameter of a proportional integral (PI) controller in a modular multilevel converter controller corresponding to an AC distribution partition, $K_I$ represents an integral parameter of the PI controller in the modular multilevel converter controller corresponding to the AC distribution partition, f represents a local frequency collected by the power networks in real time, $f_N$ represents a frequency rated value, and S(V) represents one of the tangent function mode $S_{tan}(V)$, the exponential function mode $S_{exp}(V)$, and the linear function mode containing the dead band $S_{Lp}(V)$.

6. A device for performing the method for supporting the power networks in the AC/DC distribution network according to claim 1, comprising:

a model constructing module, configured to establish the AC/DC distribution network containing the AC power network, the AC distribution network, the plurality of modular multilevel converters, multi-type loads, and the plurality of new energy power generation units;

a distributed optimization solution module, configured to divide the AC/DC distribution network into the plurality of sub-regions according to an AC/DC partition, realize the regional decoupling, and formulate boundary operation constraints between the plurality of sub-regions;

an optimization operation module, configured to perform resource dispatching by adopting an optimization method of day-ahead dispatching and intra-day rolling for the plurality of sub-regions and optimize control parameters of the plurality of modular multilevel converters;

an adaptive control mode selection module, configured to adaptively select the droop control mode according to an actual operation state of the AC/DC distribution network; and a flexible transfer module, configured to activate a power network supporting function when identifying a frequency drop of the AC power network, modify droop control modes of the plurality of modular multilevel converters, and adjust an interaction power of the plurality of sub-regions.

7. The device according to claim 6, wherein in the method for supporting the power networks in the AC/DC distribution network, the tangent function mode $S_{tan}(V)$ is $$\frac{P - P_{ref}}{P_{ref}} = D_{droop}\tan\left(\frac{V - V_{ref}}{V_{ref}}\right) = S_{tan}(V),$$

wherein P represents a real-time output power of the modular multilevel converter, $P_{ref}$ represents a power reference of the modular multilevel converter, $D_{droop}$ represents a droop coefficient of the modular multilevel converter, V represents a node voltage of the modular multilevel converter collected in real time, and $V_{ref}$ represents a voltage reference of the modular multilevel converter; and the exponential function mode $S_{exp}(V)$ is $$\frac{P - P_{ref}}{P_{ref}} = D_{droop}\frac{1}{2}\left(\left(\exp\left(\frac{V - V_{ref}}{V_{ref}}\right) - 1\right) - \left(\exp\left(-\frac{V - V_{ref}}{V_{ref}}\right) - 1\right)\right) = S_{exp}(V),$$

wherein the exponential function mode exp $S_{exp}(V)$ is adopted, and function parameters of the exponential function mode $S_{exp}(V)$ are correspondingly selected to switch the droop control mode.

8. The device according to claim 6, wherein in the method for supporting the power networks in the AC/DC distribution network, the linear function mode containing the dead band $S_{Lp}(V)$ is $$\frac{P-P_{ref}}{P_{ref}} = \begin{cases} D_{droop}\left(\dfrac{V-V_{ref}}{V_{ref}}\right), & \text{if } V_{min} \leq V \leq V_{max} \\ D_{droop}\left(\dfrac{V_{min}-V_{ref}}{V_{ref}}\right), & \text{if } V \leq V_{min} \\ D_{droop}\left(\dfrac{V_{max}-V_{ref}}{V_{ref}}\right), & \text{if } V_{max} \leq V \end{cases} = S_{Lp}(V),$$

wherein P represents a real-time output power of the modular multilevel converter, $P_{ref}$ represents a power reference of the modular multilevel converter, $D_{droop}$ represents a droop coefficient of the modular multilevel converter, V represents a node voltage of the modular multilevel converter collected in real time, $V_{max}$ represents a maximum node voltage allowed by the modular multilevel converter, $V_{min}$ represents a minimum node voltage allowed by the modular multilevel converter, and $V_{ref}$ represents a voltage reference of the modular multilevel converter.

9. The device according to claim 6, wherein in the method for supporting the power networks in the AC/DC distribution network, the basic linear function mode $S_L(V)$ is $$\frac{P-P_{ref}}{P_{ref}} = D_{droop}\left(\frac{V-V_{ref}}{V_{ref}}\right) = S_L(V),$$

wherein P represents a real-time output power of the modular multilevel converter, $P_{ref}$ represents a power reference of the modular multilevel converter, $D_{droop}$ represents a droop coefficient of the modular multilevel converter, V represents a node voltage of the modular multilevel converter collected in real time, and $V_{ref}$ represents a voltage reference of the modular multilevel converter.

10. The device according to claim 6, wherein in the method for supporting the power networks in the AC/DC distribution network, the topology has a frequency observer, base on the frequency fluctuations of the AC/DC distribution network, wherein the AC/DC distribution network performs the energy dispatching according to the frequency fluctuations, when the frequency observer observes that frequency fluctuations corresponding to the sub-regions are less than a set frequency threshold value, the power network supporting function of the topology is activated, and other sub-regions transfer powers to the sub-regions where the frequency fluctuation is less than the set frequency threshold value, to increase frequencies of the sub-regions where the frequency fluctuation is less than the set frequency threshold value by a rated value $f_N$; and when the power network supporting function is activated, the droop control mode of the AC/DC distribution network is $$\frac{P-P_{ref}}{P_{ref}} = S(V) + u_f$$

$$u_f = K_P(f_N - f) + K_I \int (f_N - f),$$

wherein P represents a real-time output power of the modular multilevel converter, $P_{ref}$ represents a power reference of the modular multilevel converter, $u_f$ represents a supplementary item of power network supporting function, $K_P$ represents a proportional parameter of a PI controller in a modular multilevel converter controller corresponding to an AC distribution partition, $K_I$ represents an integral parameter of the PI controller in the modular multilevel converter controller corresponding to the AC distribution partition, f represents a local frequency collected by the power networks in real time, $f_N$ represents a frequency rated value, and S(V) represents one of the tangent function mode $S_{tan}(V)$, the exponential function mode $S_{exp}(V)$, and the linear function mode containing the dead band $S_{Lp}(V)$.

\* \* \* \* \*